June 2, 1925.
R. B. WASSON
1,540,378
MICROMETER END CLEARANCE MACHINE
Filed Aug. 24, 1921　　6 Sheets-Sheet 6
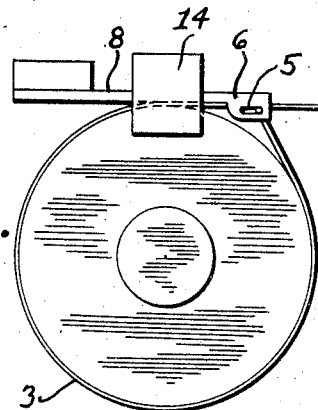
Fig. 10.
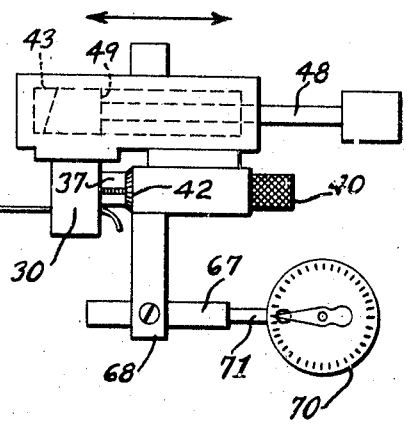
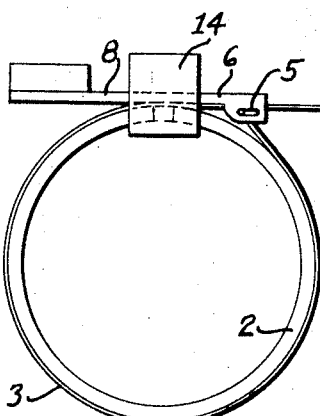
Fig. 11.
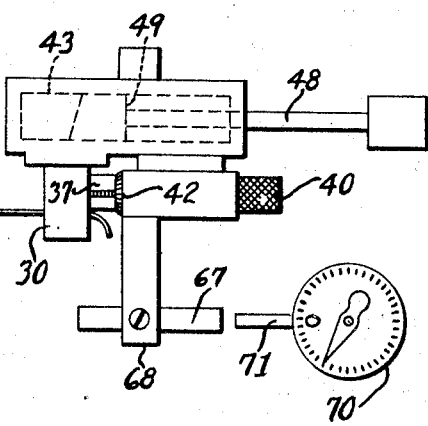
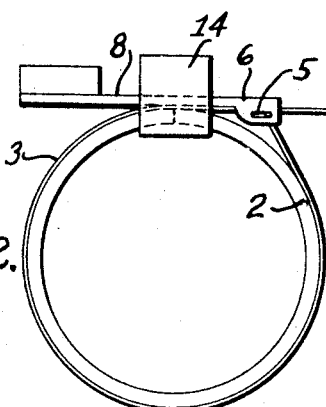
Fig. 12.
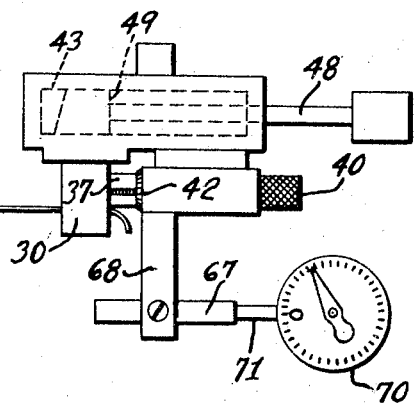
Robert B. Wasson INVENTOR
BY
W. J. Bissing ATTORNEY Patented June 2, 1925.

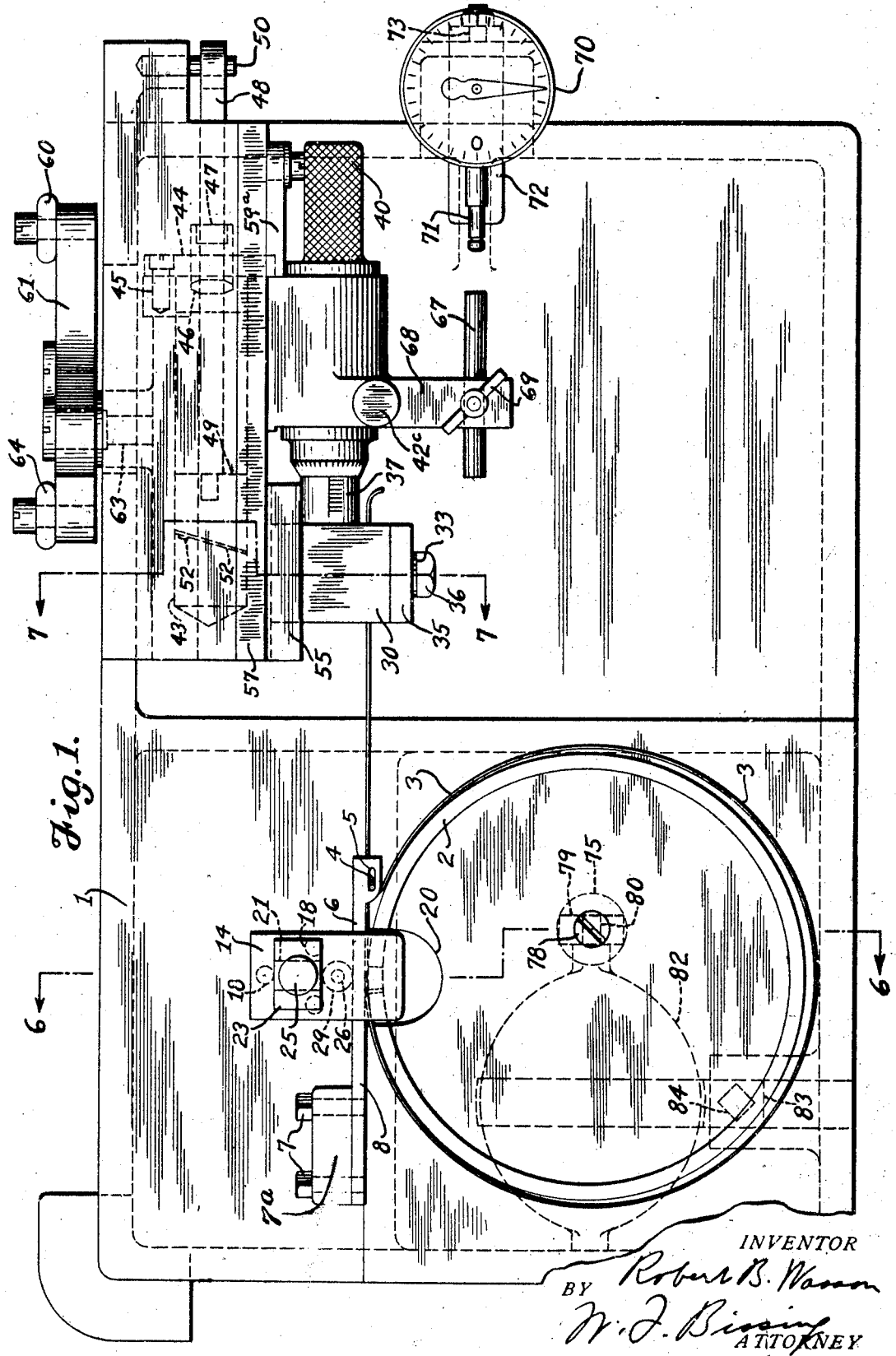

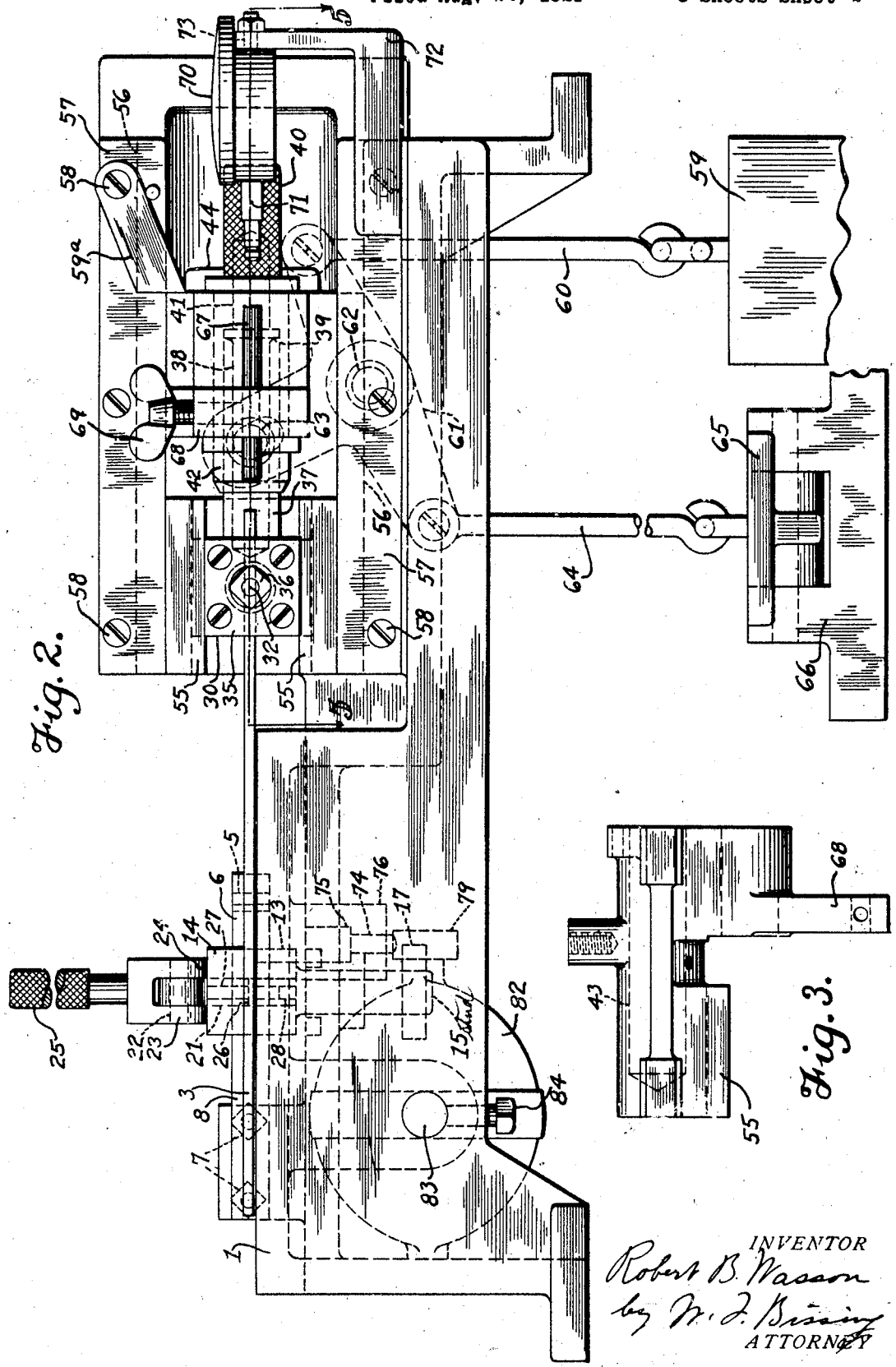

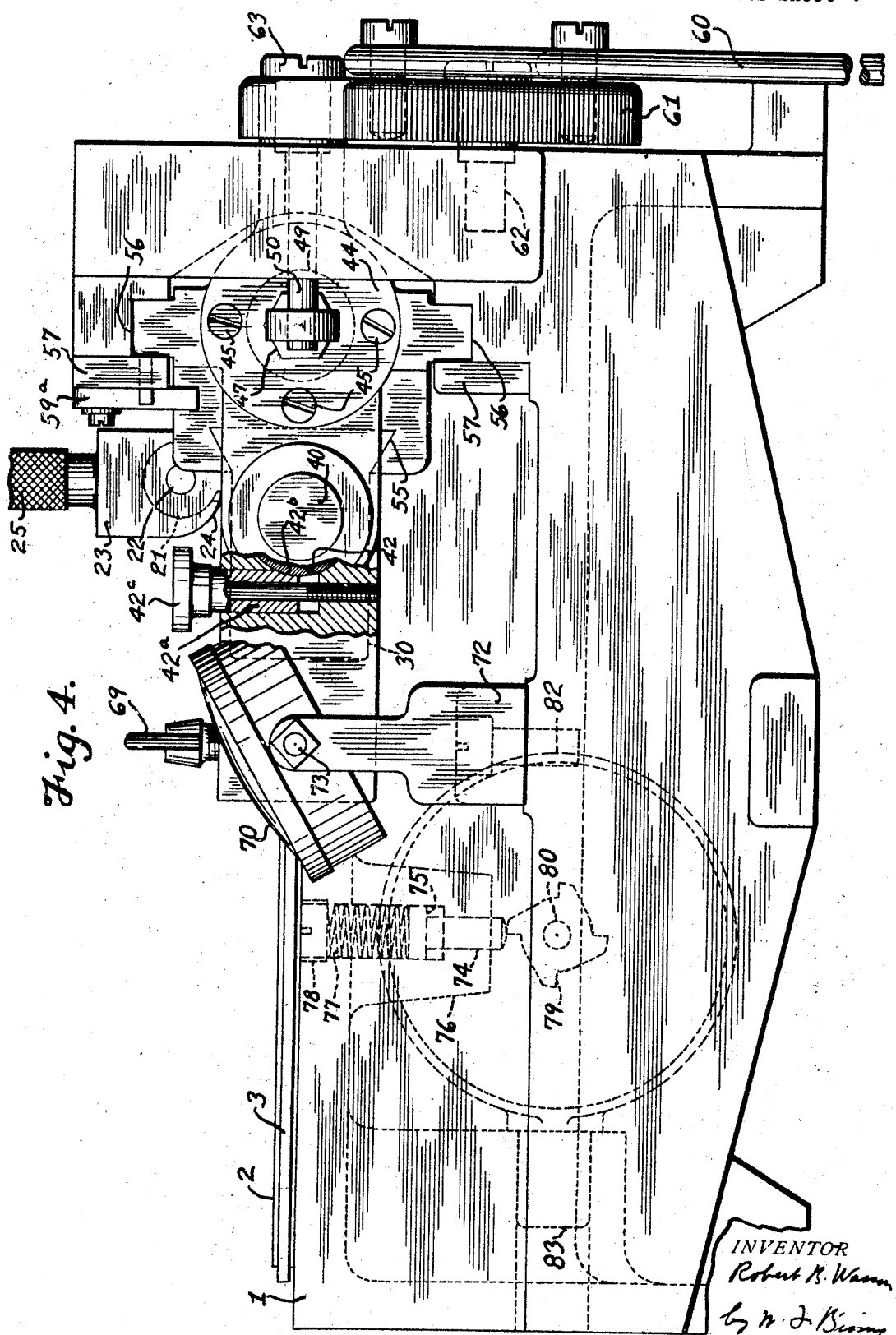

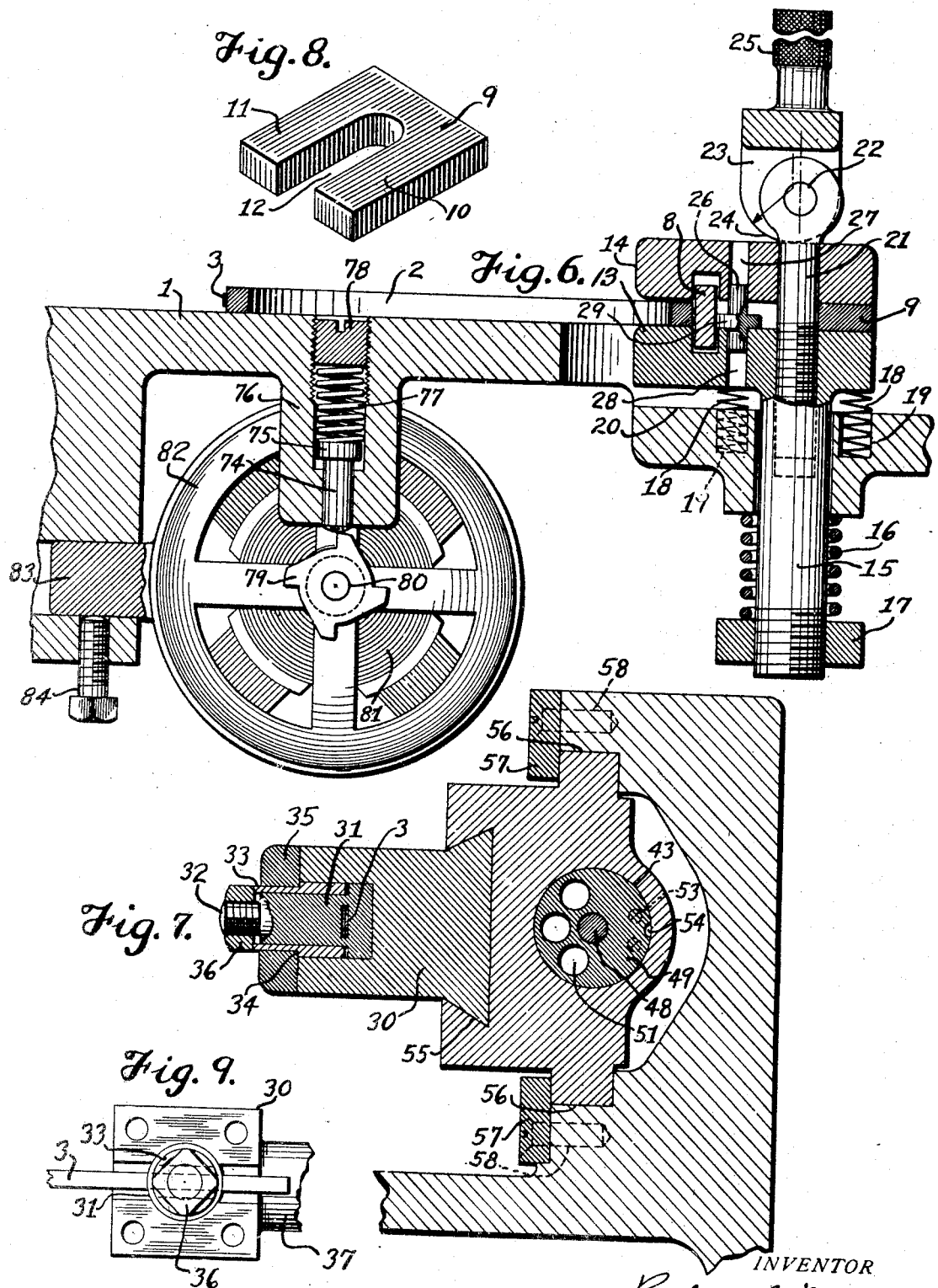

UNITED STATES PATENT OFFICE.

ROBERT B. WASSON, OF CRANFORD, NEW JERSEY.

MICROMETER END-CLEARANCE MACHINE.

Application filed August 24, 1921. Serial No. 495,076.

*To all whom it may concern:*

Be it known that I, ROBERT BINGHAM WASSON, a citizen of the United States, residing at 306 Elizabeth Ave., Cranford, New Jersey, have invented certain new and useful Improvements in Micrometer End-Clearance Machines, of which the following is a specification.

My invention relates to a machine for measuring the end clearance of piston rings, that is to say, the distance between the faces of the free ends of the ring, when the ring is in operating position, and is more particularly intended to provide such a machine which may be readily set for larger or smaller rings, thus avoiding the necessity of providing a standard sized plug for each size of ring. Another object of my invention is to provide such a machine in which the ring is permitted to float, its ends being so carried as to be freely movable, so that the flexible dimensioning band which is used in the machine to confine the ring may when under tension assume a position in the line of pull on the band without twisting or binding the band.

Another object of the invention is to provide means for always maintaining the same tangent line or plane of contact between the band and the ring, for different-sized rings.

Another object of the invention is to so construct the machine as to permit the utilization of a simple form of band instead of a forked band.

Another object of the invention is to provide a simple form of mechanism for spacing the jaw of the clamp in which the ring is located when testing, thus readily providing for the resetting of the jaws for rings of different width.

Other objects of the invention are to simplify and improve parts of the mechanism of the machine so as to make it more accurate in its operation.

With the above and other objects in view, my invention consists in the parts, improvements and combinations more fully pointed out hereinafter.

Turning now to the drawings:

Figure 1 illustrates a plan view of a machine embodying one form of my invention.

Fig. 2 is a side elevation of the machine.

Fig. 3 illustrates a detail of the dashpot.

Fig. 4 is an end elevation of the machine.

Fig. 6 is a vertical cross section on line 6—6 of Fig. 1.

Fig. 7 is a vertical cross section on the line 7—7 of Fig. 1.

Fig. 8 is a detail of the spacing block.

Fig. 9 is a detail of the clamp for the end of the band; and

Figs. 10, 11 and 12 illustrate somewhat diagrammatically the operation of testing and measuring the end clearance.

Figure 5:
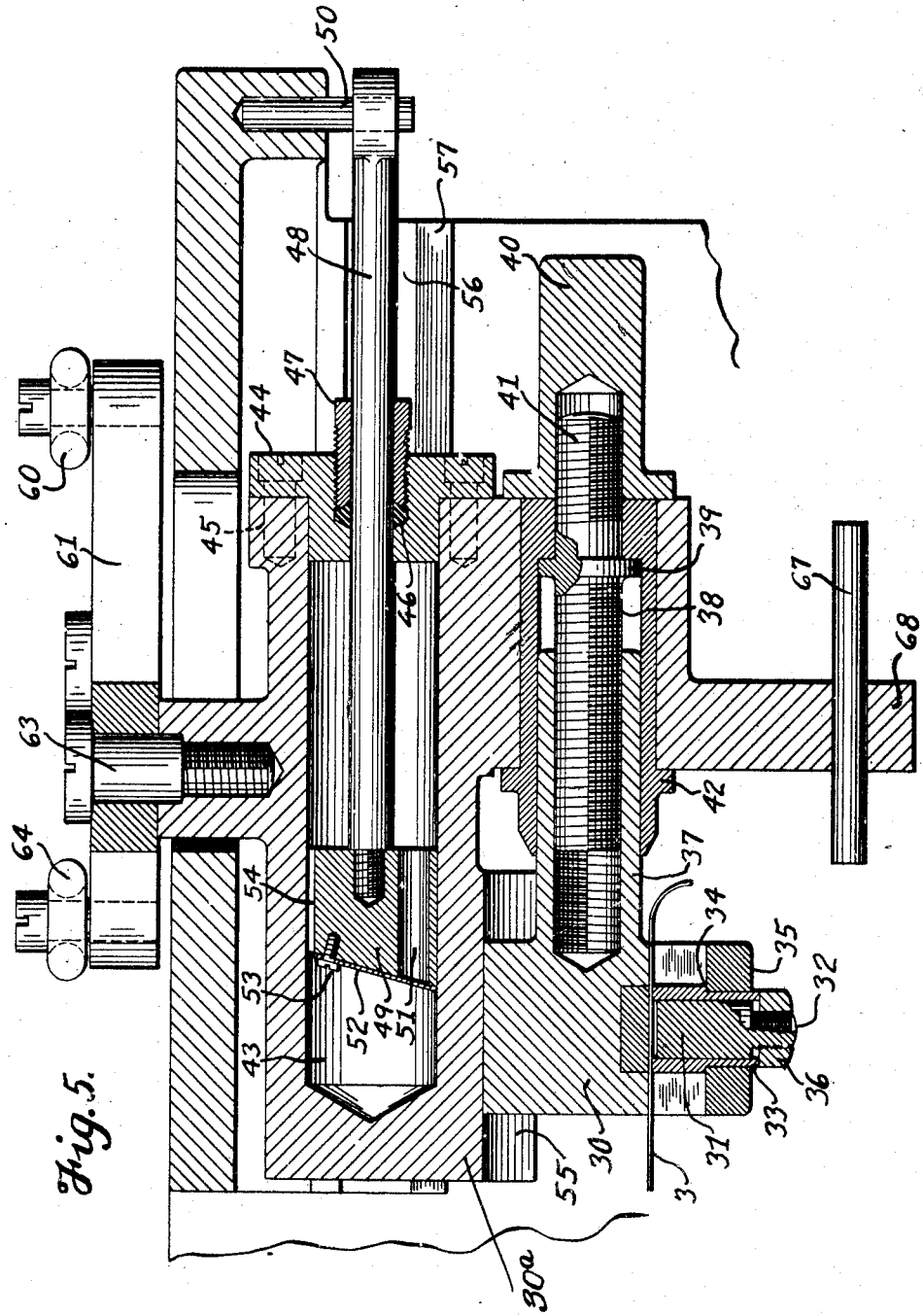
Fig. 5 is a transverse section thru the micrometer and dashpot on the line 5—5 of Fig. 2.

In the drawings, the horizontal platform 1 of the machine which is carried by the frame supported by feet, is adapted to receive the ring 2 whose end clearance is to be measured. I provide a flexible dimensioning band 3 which is adapted to confine the ring in a loop as illustrated. Means are provided for anchoring one end of the band, the other end being passed around the ring so that the path of the free end of the band lies to one side of the anchorage for the anchored end of the band. One advantage of this construction is that it permits the use of a band of uniform cross section, and makes it unnecessary to pass one end of the band thru the band to form a loop. The anchored end 4 of the band is preferably permitted to be somewhat movable (see Fig. 1). As illustrated, this end encircles a pin which in turn moves in a slot 5 in the anchor 6. By this means, when the free end of the band which is secured to slide 30 is loosened by moving the carriage 30ª to which the free end is secured, to the left, this relieving the tension on the band, the anchored end will take a position in the right of the slot 5, thus quickly enlarging the loop and permitting the rapid removal of the ring. The anchor 6 is rigidly secured to the platform as by means of bolts 7 and part 8, the bolts passing thru a projection 7ª extending from the platform.

Means are provided for maintaining the same tangent line or plane of contact between the band and the ring, for different-sized rings. These means may be varied. In the form illustrated the inner side of the part 8 forms a guide for directing the band, on its way to the clamp 30, and also forms a front stop for the ring. The successive rings even tho of different diameters, may be readily placed with their split ends against this front stop, as illustrated, thus maintaining the same tangent plane of contact between the band and the rings, for different sized rings.

Means are provided for confining the ends of the ring and preventing one end riding up on the other more than a definite amount, at the same time permitting the ends to move toward each other freely. I provide a supplementary platform 13 and jaw 14 for this purpose and simple and efficient means for limiting the approach of the jaw with respect to the platform. I make use of a gage block 9 (Figs. 5, 6 and 8) to limit the opening between the jaw and the platform. The gage block is of known thickness and is removable. It may have two wings 10 and 11 and be slotted as at 12, to permit its insertion. The thickness of this gage block is slightly greater than the width of the ring to be tested.

Means are provided for supporting the split ends of the ring, permitting them to float and permitting the dimensioning band to take up its direct line of pull without twisting or binding the band. The platform 13 and the jaw 14 are permitted to move slightly in any direction (see Fig. 6). The platform may be provided with an extension such as a stud 15 surrounded by spring 16 whose tension may be regulated by the nut 17. The spring is confined between the nut and the frame of the machine. One or more springs 18 support the platform 13. They may be placed in the sockets 19 of the frame. In this way the platform 13 and jaw 14 are yieldingly mounted so as to be movable slightly in any direction under the pull of the tensioning band when it encircles the ring to be tested. By adjusting the nut 17 the platform 13 may be raised or lowered slightly so as to keep its upper surface substantially on a level with the fixed horizontal platform supporting the body of the ring. This fixed horizontal platform is preferably cut out at 20 to provide for mounting the movable supplementary platform 13 within the cut-out portion.

Means are provided for clamping the movable jaw 14 against the spacing block 9 so as to maintain a definite size of throat for the free insertion of the ring end. In the form of the invention illustrated the extension or stud 15 is provided with a screw-threaded socket which receives a screw-threaded bolt 21 pivoted at 22 to a locking threaded bolt 21 pivoted at 22 to a locking cam or actuating member 23 with cam or curved surface 24. The member 23 may be pivoted to one side of its center. This member is provided with handle 25. The jaw 14 is preferably loosely mounted and rests by its weight upon the gage block 9.

When the handle 25 is turned pressure is applied to the upper face of the jaw 14, clamping and locking the jaw and platform in a predetermined definite relation as previously explained. In order to prevent the jaw from twisting a pin 26 is inserted into apertures 27, 28 in the jaw and platform respectively, the pin and bolt 21 preventing the twist. Means are provided for preventing the jaw and platform from binding against the part 8. The jaw and platform are recessed to receive and clear the guide 8 and the pin 26 is provided with a flange 29 engaging the face of the part 8, thus avoiding a binding action.

The distal or adjustable end of the band 3 is clamped to a slide or clamp 30. A round plug 31 is mounted in the slide and carries a screw end 32 (see Figs. 5 and 7). A sleeve 33 forms part of the clamp. The sleeve is shouldered at 34 and is kept down by a cover plate 35 which engages the shoulder and which is rigidly mounted upon the slide 30. By turning the nut 36, which is separate from the sleeve and which has a squared end, the band is clamped between the sleeve and the plug. The plug and sleeve can rotate or swivel slightly in their socket.

Means are provided for micrometrically adjusting the slide 30 with reference to the main movable carriage 30ª on which it is mounted, thus accurately adjusting the end of the band and the size of the loop for different-sized standard plugs. I provide a micrometer for this purpose. A screw threaded member or hollow sleeve 37 is connected to the slide, being preferably integral therewith (see Figs. 1, 5 and 10). A micrometer screw 38 having a flange 39 engages the hollow sleeve, the screw being rotatable by suitable means such as a handle 40 secured to the screw threaded end 41, of the micrometer screw (see Fig. 5). A gaging thimble 42 carrying gage marks on its barrel, is secured to the micrometer screw, being clamped between the flange 39 and the handle 40. The thimble may be locked in indicating position by a block 42ª with a curved face 42ᵇ fitting the thimble (see Fig. 4). A screw 42ᶜ forces the block against the thimble.

The form of the carriage may be widely varied. As illustrated, the main carriage 30ª itself forms one member of the dashpot. As illustrated the carriage is recessed so as to form the cylinder of the dashpot, the piston of the dashpot being rigidly secured to the fixed frame of the machine. The carriage is recessed so as to provide a hollow cylinder or piston chamber 43 for the purpose closed at one end by cover plate 44 bolted to the piston chamber by bolts 45 (see Fig. 5). A stuffing box provided with a packing 46 and screw adjustment 47 prevents leakage between the stem 48 of the piston 49 of the dashpot and the cylinder. The piston is rigidly held in place without movement by connecting its stem to the frame of the machine as by means of the bolt 50. The piston is provided with a plurality of apertures 51 communicating with opposite sides of the piston. A flap or disk valve 52 is carried by the piston and secured thereto by screws 53. The piston may be cut off at an angle at the end so that when forced home it will not completely fill the end of the cylinder chamber. A groove 54 is cut into the wall of the piston so as to provide a passageway of small cross section communicating with both sides of the piston.

The main carriage to which the band clamping slide 30 is adjustably connected, is provided with ways 55 for receiving the slide. The carriage itself slides back and forth in ways 56 in the frame of the machine, being held down by guide blocks 57 which are secured to the frame by screws 58 (see Figs. 4 and 7).

Means are provided for reciprocating the carriage. A weight is used for moving the carriage in the direction to tension the band. A weight 59 is connected to the carriage by link 60 and bell crank lever 61 pivoted at 62 in the frame of the machine, one arm of the bell crank being connected to the carriage by pivot bolt 63 (see Figs. 2, 4 and 5). A pivoted latch 59$^a$ holds the carriage out of indicating position against the pull of the weight.

Another arm of the bell crank may have a pedal connected thereto by means of a link 64. The pedal 65 is pivoted to block 66, which may form part of the machine frame.

Means are provided for indicating the movement of the carriage, thus determining the amount of movement of the distal end of the band from which the end clearance may be ascertained. A post 67 is provided which is adjustably mounted in bracket 68 secured to or integral with the carriage (see Fig. 1). The post may be locked in adjustable position by wing bolt 69. A multiplying indicator 70 is mounted on the machine with its operating staff 71 in line with the path of travel of the bolt. The indicator may be carried by the bracket 72 to which it may be pivotally clamped at 73 so as to permit the inclination of the indicator face at an angle, allowing easy observation of the face.

Means are provided for vibrating the ring when in contact with the encircling band so as to reduce the friction between the band and the ring; thus permitting accurate reading to be obtained. As illustrated, the platform carrying the ring is vibrated (see Fig. 6). A plug 74 with its head 75 is caused to strike the bottom of a socket 76 in which the plug is mounted. The socket forms part of the frame. A spring 77 actuates the plug, its tension being adjusted by the screw nut 78. A lifting cam 79 lifts the plug, the cam being rotated by its carrying shaft 80 which is turned by the armature 81 of an electric motor. The frame 82 of the motor is secured to the frame of the machine by means of an extension 83 held in place by a bolt 84.

Having thus described my invention, its operation is as follows (referring for example to Figs. 10, 11 and 12):

A standard plug is placed in the loop of the band with the micrometer set at zero both on the barrel and thimble (see Fig. 10). The slack is taken up in the band by loosening the clamping nut 36 for the distal end of the band. The band is pulled tight around the plug and the clamping screw is then tightened. The pivoted latch or carriage stop 59$^a$, Figs. 1 and 2 is thrown out of the way of the carriage and the weight now applies its force to gently pull the carriage toward the indicator. The dashpot checks the inertia of the weight. The band is thus pulled firmly around the plug 67, Fig. 1. The contact post which actuates the staff of the dial indicator is so set that the dial registers. The vibrator is then operated until the parts are thoroly settled and the friction between the plug and the band removed. The dial indicator is now set at zero by turning the dial. This sets the machine for a standard ring of the size of plug used. The plug may now be removed and the split ring to be tested inserted in its place (see Fig. 11). To do this the operator first places his foot on the pedal 65, Fig. 2, thereby retracting the carriage and slackening the loop in the band. The carriage may be held retracted by the pivoted stop. The new ring can then be inserted in the loop and the carriage allowed to move so as to tension the band under the influence of the weight (see Fig. 12). The contact post on the carriage actuates the dial indicator giving a reading, which may either be plus or minus and of the correct or incorrect amount. If the reading is minus, i. e., to the right of the zero, for example, it indicates the amount of end clearance which the ring possesses. If this reading be too great, the ring is re-processed.

If the reading is plus, i. e., to the left of the zero of the dial indicator, for example, it indicates that the end clearance is too great and the ring is subjected thereupon to a re-processing operation.

The micrometer is used to adjust the machine for variations in size of ring from the standard plug. This avoids the necessity of building and accurately manufacturing a large number of standard plugs. The graduations on the thimble of the micrometer may be suitably chosen. For example they may represent thousandths in the diameter of the ring. One complete turn of the thimble may represent twenty thousandths of an inch (.020 inch) in the diameter of the ring. Three complete turns on the thimble plus two and one-half divisions of the thimble may equal one-sixteenth inch in the diameter of the ring.

From the readings on the dial indicator, the end clearance may be calculated. If the ring is cut with the faces of the ends at the joint or split portions at right angles to the body of the ring, the reading on the indicator will give the end clearance directly. If the ring is cut with its ends at an angle, as for example at 30 degrees, the reading on the indicator if the angle is thirty degrees will be twice the end clearance.

From the foregoing it will be observed that the machine is adapted to measure the end clearance of rings of different sizes in an accurate manner. It will also be observed that changes may be made, without departing from the principle of the invention.

What I claim and desire to secure by Letters Patent is:

1. A machine for measuring the end clearance of piston rings comprising in combination a dimensioning, flexible band adapted to confine the ring in a loop, an anchorage for one end of the band, a clamp for the distal end of the band, a member carrying said clamp, means for adjusting said member, means for bodily moving said adjusting means and an indicator for showing the amount of the bodily movement of the adjusting means, thereby determining the end clearance.

2. A machine for measuring the end clearance of piston rings comprising in combination a dimensioning, flexible band adapted to confine the ring in a loop, an anchorage for one end of the band, a clamp for the distal end of the band, a slide carrying said clamp, means for micrometrically adjusting said slide, means for bodily moving said adjusting means and an indicator for showing the amount of the bodily movement of the adjusting means, thereby determining the end clearance.

3. A machine for measuring the end clearance of piston rings comprising in combination a dimensioning, flexible band adapted to confine the ring in a loop, an anchorage for one end of the band, a clamp for the distal end of the band, a slide carrying said clamp, means for micrometrically adjusting said slide, a carriage on which said slide is mounted, a member carried by said carriage, and an indicator actuated by said member, thereby determining the end clearance.

4. A machine for measuring the end clearance of piston rings comprising in combination a dimensioning, flexible band adapted to confine the ring in a loop, an anchorage for one end of the band, a clamp for the distal end of the band, a slide carrying said clamp, means fo micrometrically adjusting said slide, a carriage on which said slide is mounted, an adjustable post carried by said carriage and an indicator actuated by said post, thereby determining the end clearance.

5. A machine for measuring the end clearance of piston rings comprising in combination a dimensioning, flexible band adapted to confine the ring in a loop, an anchorage for one end of the band, a clamp for the distal end of the band, a slide carrying said clamp, means for micrometrically adjusting said slide, said adjusting means comprising a screw-threaded member connected to said slide, a rotatable screw engaging said screw-threaded member, a carriage on which said slide is mounted, a member carried by said carriage, and an indicator actuated by said member, thereby determining the end clearance.

6. A machine for measuring the end clearance of piston rings comprising in combination a dimensioning, flexible band adapted to confine the ring in a loop, an anchorage for one end of the band, a clamp for the distal end of the band, a slide carrying said clamp, means for micrometrically adjusting said slide, said adjusting means comprising a screw-threaded sleeve integral with said slide, a micrometric screw engaging said sleeve, a stem secured to said screw for rotating it, a carriage on which said slide is mounted, an adjustable post carried by said carriage, and an indicator actuated by said post, thereby determining the end clearance.

7. A machine for measuring the end clearance of piston rings comprising in combination a dimensioning, flexible band adapted to confine the ring in a loop, an anchorage for one end of the band, a clamp for the distal end of the band, a slide carrying said clamp, means for adjusting said slide, a carriage provided with a dashpot with which carriage said slide is in sliding engagement and means for moving said carriage.

8. A machine for measuring the end clearance of piston rings comprising in combination a dimensioning, flexible band adapted to confine the ring in a loop, an anchorage for one end of the band, a clamp for the distal end of the band, a slide carrying said clamp, means for adjusting said slide, a sliding carriage having a dashpot with which carriage said slide is in sliding engagement, a fixed piston cooperating with said dashpot and means for moving said carriage.

9. A machine for measuring the end clearance of piston rings comprising in combination a dimensioning, flexible band adapted to confine the ring in a loop, an anchorage for one end of the band, a clamp for the distal end of the band, a slide carrying said clamp, means for adjusting said slide, a carriage having a dashpot with which carriage said slide is in sliding engagement, and a weight for moving said carriage so as to apply tension to the band.

10. A machine for measuring the end clearance of piston rings comprising in combination a dimensioning, flexible band adapted to confine the ring in a loop, an anchorage for one end of the band, a clamp for the distal end of the band, a slide carrying said clamp, means for adjusting said slide, a carriage having a dashpot with which carriage said slide is in sliding engagement, a weight for moving said carriage so as to apply tension to the band and means actuated by the operator for returning said carriage against the force of the weight.

11. A machine for measuring the end clearance of piston rings comprising in combination a dimensioning, flexible band adapted to confine the ring in a loop, means for anchoring one end of the band at one side of the path of the distal portion of the band, a clamp for the distal end of the band, means for bodily moving said clamp and an indicator for showing the amount of the said movement.

12. A machine for measuring the end clearance of piston rings comprising in combination a dimensioning, flexible band adapted to confine the ring in a loop, means for anchoring one end of the band at one side of the path of the distal portion of the band, a clamp for the distal end of the band, a sliding carriage upon which said clamp is mounted, means for sliding said carriage and an indicator for showing the amount of said movement.

13. A machine for measuring the end clearance of piston rings comprising in combination a dimensioning, flexible band adapted to confine the ring in a loop, an anchor for anchoring one end of the band at one side of the path of the distal portion of the band, said anchor provided with a slot, the anchored end of the band carrying a pin engaging said slot, a clamp for the distal end of the band, a carriage upon which said clamp is mounted, means for moving said carriage and an indicator for showing the amount of said movement.

14. A machine for measuring the end clearance of piston rings comprising in combination a dimensioning, flexible band adapted to confine the ring in a loop, means for anchoring one end of the band at one side of the path of the distal portion of the band, a front stop for the ring, a clamp for the distal end of the band, a carriage on which said clamp is mounted, means for moving said carriage and an indicator for showing the amount of said movement.

15. A machine for measuring the end clearance of piston rings comprising in combination a dimensioning, flexible band adapted to confine the ring in a loop, an anchorage for anchoring one end of the band, a guide for directing the band to one side of the anchorage, a reciprocating clamp for the distal end of the band, means for reciprocating said clamp and an indicator for showing the amount of said movement.

16. A machine for measuring the end clearance of piston rings comprising in combination a dimensioning band, adapted to confine the ring in a loop, an anchorage for one end of the band, means for moving the other end of the band, an indicator for indicating the amount of movement, means for confining the ends of the ring against lateral displacement at the same time permitting the ends to approach each other, when the ring under test is in the loop, and means for yieldingly mounting said confining means, permitting the confining means to move under the pull of the band, thus allowing the band to take up its direct line of pull.

17. A machine for measuring the end clearance of piston rings comprising in combination a dimensioning band, adapted to confine the ring in a loop, an anchorage for one end of the band, means for moving the other end of the band, an indicator for indicating the amount of movement, a platform and jaw for confining the ends of the ring against lateral displacement at the same time permitting the ends to approach each other, when the ring under test is in the loop, and means for yieldingly mounting said platform, permitting the platform to move under the pull of the band, thus allowing the band to take up its direct line of pull.

18. A machine for measuring the end clearance of piston rings comprising in combination a dimensioning band, adapted to confine the ring in a loop, an anchorage for one end of the band, means for moving the other end of the band, an indicator for indicating the amount of movement, a platform and jaw for confining the ends of the ring against lateral displacement at the same time permitting the ends to approach each other, when the ring under test is in the loop, said platform and jaw being relatively movable toward and away from each other, and a plurality of springs supporting said platform, permitting the platform to move under the pull of the band, thus allowing the band to take up its direct line of pull.

19. A machine for measuring the end clearance of piston rings comprising in combination a dimensioning band, adapted to confine the ring in a loop, an anchorage for one end of the band, means for moving the other end of the band, an indicator for indicating the amount of movement, a platform and jaw for confining the ends of the ring against lateral displacement at the same time permitting the ends to approach each other, when the ring under test is in the loop, means for yieldingly supporting said platform, an extension carried by said platform, a spring surrounding said extension, thereby permitting the platform to move under the pull of the band, thus allowing the band to take up its direct line of pull.

20. A machine for measuring the end clearance of piston rings comprising in combination a dimensioning band, adapted to confine the ring in a loop, an anchorage for one end of the band, means for moving the other end of the band, an indicator for indicating the amount of movement, a platform and jaw for confining the ends of the ring against lateral displacement, at the same time permitting the ends to approach each other, said jaw being movable toward and away from the platform when the ring under test is in the loop, three springs supporting said platform, an extension carried by said platform, a spring surrounding said extension, thereby permitting the platform to move under the pull of the band.

21. A machine for measuring the end clearance of piston rings comprising in combination a dimensioning band, adapted to confine the ring in a loop, an anchorage for one end of the band, means for moving the other end of the band, an indicator for indicating the amount of movement, a platform and jaw for confining the ends of the ring against lateral displacement at the same time permitting the ends to approach each other, when the ring under test is in the loop, means for yieldingly supporting said platform, a screw-threaded stud carried by said platform, a spring surrounding said stud, a nut for compressing said spring, thereby permitting the platform to move under the pull of the band.

22. A machine for measuring the end clearance of piston rings comprising in combination a dimensioning band, adapted to confine the ring in a loop, an anchorage for one end of the band, means for moving the other end of the band, an indicator for indicating the amount of movement, a platform and jaw for confining the ends of the ring against lateral displacement at the same time permitting the ends to approach each other, a guide pin for preventing twisting of the jaw, and means for yieldingly mounting said platform, permitting the platform to move under the pull of the band, thus allowing the band to take up its direct line of pull.

23. A machine for measuring the end clearance of piston rings comprising in combination a dimensioning band, adapted to confine the ring in a loop, an anchorage for one end of the band, means for moving the other end of the band, an indicator for indicating the amount of movement, a platform and jaw for confining the ends of the ring against lateral displacement at the same time permitting the ends to approach each other, a guide pin for preventing twisting of the jaw, a flange on the guide pin, a guide for said band, and means for yieldingly mounting said platform, permitting the platform to move under the pull of the band, thus allowing the band to take up its direct line of pull.

24. A machine for measuring the end clearance of piston rings comprising in combination a dimensioning band, adapted to confine the ring in a loop, an anchorage for one end of the band, means for moving the other end of the band, an indicator for indicating the amount of movement, a platform and jaw for confining the ends of the ring against lateral displacement at the same time permitting the ends to approach each other, when the ring under test is in the loop, a gage block for separating the platform and the jaw, and means for yieldingly mounting said platform, permitting the platform to move under the pull of the band.

25. A machine for measuring the end clearance of piston rings comprising in combination a dimensioning band, adapted to confine the ring in a loop, an anchorage for one end of the band, means for moving the other end of the band, an indicator for indicating the amount of movement, a platform and jaw for confining the ends of the ring against lateral displacement at the same time permitting the ends to approach each other, when the ring under test is in the loop, a gage block for separating the platform and the jaw, a cam for clamping the jaw against the gage block, and means for yieldingly mounting said platform, permitting the platform to move under the pull of the band.

26. A machine for measuring the end clearance of piston rings comprising in combination a dimensioning band, adapted to confine the ring in a loop, an anchorage for one end of the band, means for moving the other end of the band, an indicator for indicating the amount of movement, a platform and jaw for confining the ends of the ring against lateral displacement at the same time permitting the ends to approach each other, when the ring under test is in the loop, a gage block for separating the platform and the jaw, a cam for clamping the jaw against the gage block, and a handle for actuating said cam.

27. A machine for measuring the end clearance of piston rings comprising in combination a dimensioning band, adapted to confine the ring in a loop, an anchorage for one end of the band, means for moving the other end of the band, an indicator for indicating the amount of movement, a main platform for supporting the body of the ring, said platform provided with a recess, a movable platform mounted in said recess, a jaw cooperating with said movable platform, and a spacing block for separating said jaw and movable platform.

28. A machine for measuring the end clearance of piston rings comprising in combination a dimensioning band, adapted to confine the ring in a loop, an anchorage for one end of the band, means for moving the other end of the band, an indicator for indicating the amount of movement, a main platform for supporting the body of the ring, said platform provided with a recess, a movable platform mounted in said recess, a jaw cooperating with said movable platform, and means for yieldingly supporting said platform and jaw.

29. A machine for measuring the end clearance of piston rings comprising in combination a dimensioning band, adapted to confine the ring in a loop, an anchorage for one end of the band, means for moving the other end of the band, an indicator for indicating the amount of movement, a main platform for supporting the body of the ring, said platform provided with a recess, a front stop for the ring located adjacent to said recess, a movable platform mounted in said recess, a jaw cooperating with said movable platform, and means for yieldingly supporting said platform and jaw.

30. A machine for measuring the end clearance of piston rings comprising in combination a dimensioning, flexible band adapted to confine the ring in a loop, an anchorage for one end of the band, a clamp for the distal end of the band, a slide carrying said clamp, means for adjusting said slide, a carriage having a dashpot with which carriage said slide is in sliding engagement, a movable carriage stop, a weight for moving said carriage so as to apply tension to the band and a pedal for returning said carriage against the force of the weight.

31. A machine for measuring the end clearance of piston rings comprising in combination a dimensioning, flexible band adapted to confine the ring in a loop, means for anchoring one end of the band at one side of the path of the distal portion of the band, a clamp for the distal end of the band, means for bodily moving said clamp, a bracket, means connected with said clamp for actuating the indicator, and an indicator pivoted to said bracket, for showing the amount of movement of said clamp.

32. A machine for measuring the end clearance of piston rings comprising in combination a dimensioning, flexible band adapted to confine the ring in a loop, means for anchoring one end of the band at one side of the path of the distal portion of the band, a clamp for the distal end of the band, a carriage upon which said clamp is mounted, means for moving said carriage, a bracket and an indicator pivoted to said bracket and actuated by said carriage, for showing the amount of movement of said carriage.

33. A machine for measuring the end clearance of piston rings comprising in combination a dimensioning, flexible band adapted to confine the ring in a loop, a platform for supporting the body of the ring, an anchorage for one end of the band, a clamp for the distal end of the band, a slide carrying said clamp, means for micrometrically adjusting said slide, a carriage on which said slide is mounted, and means for vibrating said platform.

34. A machine for measuring the end clearance of piston rings comprising in combination a dimensioning, flexible band adapted to confine the ring in a loop, a platform for supporting the body of the ring, a motor arranged beneath said platform, a device actuated by said motor for vibrating said platform, an anchorage for one end of the band, a clamp for the distal end of the band, a carriage on which said clamp is mounted, means for moving said carriage and means for indicating its movement.

In testimony whereof, I have signed my name to this specification.

ROBERT B. WASSON.

Witness:
LOUELLA F. LITTLE.